United States Patent [19]

Johansson et al.

[11] 4,194,138

[45] Mar. 18, 1980

[54] SPARK GAP DEVICES

[75] Inventors: Bengt Johansson; Erland Nilsson, both of Ludvika, Sweden

[73] Assignee: ASEA Aktiebolag, Vesteras, Sweden

[21] Appl. No.: 959,214

[22] Filed: Nov. 9, 1978

[30] Foreign Application Priority Data

Nov. 11, 1977 [SE] Sweden ............................. 7712756

[51] Int. Cl.[2] ......................... H01J 1/92; H02H 9/06

[52] U.S. Cl. ...................................... 313/3; 313/325; 361/130

[58] Field of Search ..................... 313/3, 325; 361/130

[56] References Cited

U.S. PATENT DOCUMENTS

| | | | |
|---|---|---|---|
| 3,076,114 | 1/1963 | Hicks | 315/36 X |
| 3,704,388 | 11/1972 | Johansson et al. | 315/36 |
| 4,134,146 | 1/1979 | Stetson | 315/36 X |

*Primary Examiner*—Alfred E. Smith
*Assistant Examiner*—Charles F. Roberts
*Attorney, Agent, or Firm*—Watson, Cole, Grindle & Watson

[57] ABSTRACT

In a spark gap device a number of arc-resistant insulating elements are stacked in spaced relationship to form spaces between adjacent insulating elements with each element having a through-hole. At least two metallic electrodes are sandwiched between the respective surfaces of adjacent insulating elements in spaced relation to form a spark-over gap therebetween. Each electrode includes a recessed portion and the recessed portions of aligned electrodes on respective opposite sides of an insulating element extend through each of the through-holes in contacting relationship. The insulating elements each include at least one elevation which projects snugly into the recessed portion of an associated electrode.

7 Claims, 2 Drawing Figures

SPARK GAP DEVICES

BACKGROUND

1. Field of the Invention

The present invention relates to spark gap devices, and particularly to such devices designed for surge diverters with magnetic blow-out, wherein a number of axially stacked discs of arc-resistance insulating material are spaced and support metallic electrodes connected through holes in each of the discs to form spark gaps.

2. Prior Art

In a spark gap for surge diverters of the kind referred to above, the arc is extended between insulating discs of arc-resistant, usually ceramic, material. The electrodes for the base points of the arc are attached to the discs, which are fixed in relation to each other by fitting protrusions on a disc into corresponding recesses on an adjacent disc. The spark-over distance between the electrodes thus becomes dependent on the ceramic tolerances and variations therein, which can be relatively great, among other things because the press tool for the manufacture of the discs is subjected to wear. As it is very important that the variations of the spark-over voltage is small, the aforementioned tolerances and variations therein are disadvantageous factors.

In the frequently used type of spark gap arrangements having stackable discs, in which the electrodes forming a spark gap are only attached on one disc each, four tolerances and variations therein are possible, namely, two in the vicinity of the rivet holes of the two discs, and two in the vicinity of the protrusions and recesses on the discs.

Attempts has been made to improve the above-mentioned disadvantage, among other things by different ways of attaching electrodes belonging to the same gap to one disc, for example by gluing and riveting. In this way the advantage is gained that the spark-over voltage is not controlled by the play between the discs. However, these solutions usually result in more complicated and expensive manufacture, and furthermore the ability of the discs to become stacked is restricted.

In the type of spark gas discs which are normally used at present, the fastening of the electrodes to the more or less brittle ceramic material also involves difficulties. Up to now, the electrodes have normally been fixed by riveting using specially made copper rivets. Such riveting is difficult to perform since, on the one hand, the pressure that can be used is limited with respect to the strength of the discs, whereas on the other hand a good electrical contact must be created between the rivet and the electrodes, since the passage of current between the electrodes takes place via the rivet.

SUMMARY OF THE INVENTION

The main purpose of the invention is to provide, in spark gap devices to which the invention relates, an improved precision of the spark-over voltage in a relatively simple manner. This is accomplished by providing each electrode with a recess which fits into a through-hole in the associated disc which has an elevation projecting snugly into the recess of one of the electrodes of an adjacent disc. The arrangement according to the invention improves the control of the spark-over distance of the spark gaps, since from one electrode to the next there is only a ceramic fit-up, namely between the elevation of the disc and the recessed portion in the metal electrode, which can easily be precision-made. Furthermore, the tolerance control can be performed mutually from one elevation and one electrode from each opposite disc side.

If the pressing down of the electrode is made even deeper, so that a contact is established with the opposite electrode, the riveting is simplified by riveting two metal plates together (as has been previously proposed in U.S. Pat. No. 3,704,388), and the binding rivet does not have to constitute a current conductor. The riveting can also be replaced by welding.

BRIEF DESCRIPTION OF THE FIGURES

The invention will now be described in more detail with reference to an exemplary embodiment schematically shown in the accompanying drawing, wherein.

DETAILED DESCRIPTION

Figure 1:
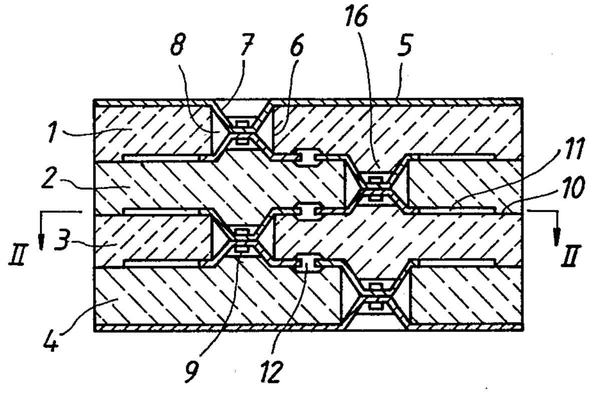
FIG. 1 shows a vertical section (along the line I—I of FIG. 2) through a spark gap device according to the invention.
Figure 2:
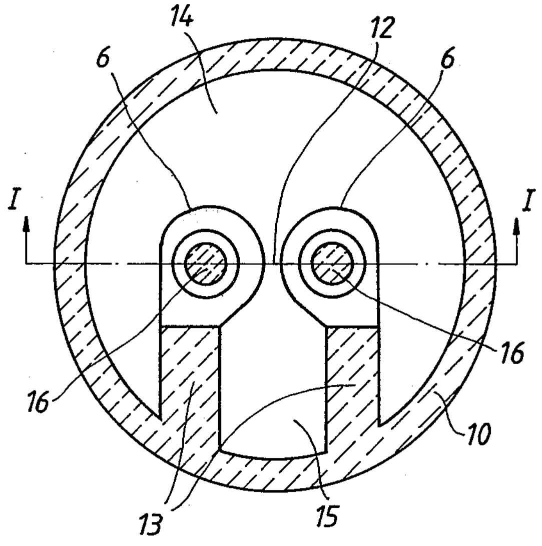
FIG. 2 shows a horizontal section along the line II—II of FIG. 1.

The spark gap device shown in the drawing consists of four round discs 1–4 of arc-resistant insulating material stacked on top of each other. Each of the outwardly-facing sides of end discs 1 and 4 is provided with an end plate 5, and an electrode 6 on each of the inwardly-facing sides. The intermediate discs 2 and 3 have an electrode 6 on each side. Each end plate 5 and electrode 6 are provided with a recessed portion 7, which fits into a through-hole 8 in the respective disc. The depth of the recessed portion is approximately equal to half the thickness of the disc. The two electrodes 6 on each intermediate disc 2, 3 (and electrode 6 and end plate 5 on the end discs 1, 4 respectively) are connected to each other by means of a rivet 9 in the through-hole 8. When the rivet has been upset, the electrode recesses 7 are in contact with one another, and the current passage takes place directly between the contacting electrodes. With such a design, a simple and fast riveting of metal against metal is achieved, making it possible to use ordinary tubular rivets which do not have to constitute current conductors.

Discs 1–3 have a downwardly-directed edge portion 10 extending all around the discs, thus forming cavity 11 between adjacent discs. The electrodes located in the same cavity when the discs are stacked on top of each other form a spark-over distance 12, in which an arc occurs when the surge diverter ignites. By means of insulating barriers 13, cavity 11 is divided into extinction chamber 14 and ionization space 15. A necessary ionization device, as well as any control impedance elements (not shown), for the spark-over point is placed in space 15.

On either side of intermediate discs 2, 3, and on the inwardly-facing side of end discs 1, 4, there is arranged elevation 16 in the form of a truncated cone. These elevations in the respective disc fit into corresponding recesses in the electrodes of adjacent discs. In this way the spark-over distance in the spark gaps between the electrodes is controlled by contours on the same disc, and this results in only one ceramic fit from one electrode to the next. A spark-gap arrangement built up from stackable discs of this design has an extremely stable spark-over voltage notwithstanding the fact that electrodes belonging to the same spark gap are not attached to the same disc.

Additionally, by forming the fit between the discs in the manner described above, the further advantage is provided that elevation 16 can be obtained through a replaceable part of the press tool, thus considerably reducing the tool cost.

The invention is not limited to the embodiment shown in the drawing but can be realized in many different ways. For example, spark-over distance 12 does not have to be arranged centrally on the disc but can also be arranged nearer to the edge of the disc, such that consecutive spark-over distances can be arranged angularly displaced with respect to each other.

What is claimed is:

1. Spark gap device comprising a number of arc-resistant insulating elements stacked in spaced relationship to form spaces between adjacent elements, each said element having a through-hole;

at least two metallic electrodes sandwiched between the respective surfaces of adjacent insulating elements in spaced relation to form a spark-over gap therebetween and each electrode including a recessed portion, and the recessed portions of aligned electrodes on respective opposite sides of an insulating element extending through each of said through-holes in contacting relationship;

a metallic electrode arranged on the outer surface of each outer insulating element and including a recessed portion extending into the through-hole of the associated outer insulating element into contacting relationship with an associated one of the at least two metallic electrodes sandwiched between the respective outer insulating element and the next adjacent insulating element; and said insulating elements each include at least one elevation projecting snugly into the recessed portion of an electrode of an adjacent element.

2. Spark gap device as in claim 1 wherein said insulating elements include a peripheral ridge to form said spaces between adjacent elements, each of the at least two electrodes arranged between adjacent elements having portions extending into said spaces and being engaged by the opposite surfaces of the adjacent insulating elements, and a spark gap formed between two adjacent insulating elements being serially connected to another spark gap formed in the next two adjacent insulating elements through the electrical contact formed by the engagement of two of said electrodes within a through-hole.

3. Spark gap device according to claim 2 wherein the recessed portion of each said electrode has a depth of approximately half the thickness of each said insulating element, so that a direct metallic contact is attained between each two contacting electrodes.

4. Spark gap device as in claim 1 or 2 further comprising insulating barriers formed in the spaces between said insulating elements for dividing at least some of the spaces therebetween into an arc extinction chamber and an ionization space.

5. Spark gap device as in claim 1 or 3 wherein said recessed portions and said elevations are formed as truncated cones.

6. Spark gap device according to claim 1 or 3 wherein the contacting electrodes are joined by metal-to-metal riveting.

7. Spark gap device according to claim 1 or 3 wherein the contacting electrodes are joined by welding.

* * * * *